United States Patent
Howcroft et al.

(10) Patent No.: US 9,906,826 B2
(45) Date of Patent: *Feb. 27, 2018

(54) APPARATUS AND METHOD FOR MEDIA DETECTION AND REPLACEMENT

(71) Applicant: AT&T INTELLECTUAL PROPERTY I, LP, Atlanta, GA (US)

(72) Inventors: Jerald R. Howcroft, Beverly Hills, MI (US); Michael Raftelis, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,137

(22) Filed: Dec. 11, 2015

(65) Prior Publication Data

US 2016/0100208 A1 Apr. 7, 2016

Related U.S. Application Data

(63) Continuation of application No. 12/570,601, filed on Sep. 30, 2009, now Pat. No. 9,241,185.

(51) Int. Cl.
*H04N 21/2668* (2011.01)
*H04N 7/173* (2011.01)
(Continued)

(52) U.S. Cl.
CPC ..... *H04N 21/2668* (2013.01); *H04N 7/17318* (2013.01); *H04N 21/2343* (2013.01); *H04N 21/2358* (2013.01); *H04N 21/2665* (2013.01); *H04N 21/4394* (2013.01); *H04N 21/4396* (2013.01); *H04N 21/440236* (2013.01);
(Continued)

(58) Field of Classification Search
CPC .... H04N 21/233; H04N 21/4394; H04N 1/00; H04N 1/00336; H04N 1/32144; H04N 1/32149; H04N 1/32154; H04N 1/32187; H04N 1/32192; H04N 1/32197; H04N 1/32203; H04N 1/32208; H04N 1/3232;
(Continued)

(56) References Cited

U.S. PATENT DOCUMENTS 5,838,790 A * 11/1998 McAuliffe ............ H04L 63/123
  705/77
7,490,053 B1 * 2/2009 Emerson, III ..... G06Q 30/0264
  705/14.61

(Continued)

*Primary Examiner* — Benjamin R Bruckart
*Assistant Examiner* — Anthony Bantamoi
(74) *Attorney, Agent, or Firm* — Guntin & Gust, PLC; Robert Gingher (57) ABSTRACT

A system that incorporates teachings of the present disclosure may include, for example, a server having a controller configured to identify audio content of interest associated with an audio portion of a media program. Alternate audio content is identified. Responsive to a detection of the audio content of interest within a textual representation of the audio portion, an indicator including a pointer is inserted into the media program. The pointer points to the alternate audio content and is inserted at a start point of the occurrence of the audio content of interest within the media program. The alternate audio content is retrieved based on the pointer and substituted with the alternate audio content beginning at the start point. Other embodiments are disclosed.

20 Claims, 10 Drawing Sheets

(51) Int. Cl.
*H04N 21/2343* (2011.01)
*H04N 21/439* (2011.01)
*H04N 21/4402* (2011.01)
*H04N 21/454* (2011.01)
*H04N 21/235* (2011.01)
*H04N 21/2665* (2011.01)
*H04N 21/81* (2011.01)
*H04N 21/845* (2011.01)

(52) U.S. Cl.
CPC ..... *H04N 21/4542* (2013.01); *H04N 21/8106* (2013.01); *H04N 21/8455* (2013.01)

(58) Field of Classification Search
CPC ............. H04N 1/32331; H04N 19/467; H04N 21/2389; G06Q 30/0264
See application file for complete search history.

(56) References Cited

U.S. PATENT DOCUMENTS

| | | |
|---|---|---|
| 2002/0056093 A1* | 5/2002 | Kunkel .................... H04N 7/16 725/35 |
| 2002/0078220 A1 | 6/2002 | Ryan et al. |
| 2006/0095262 A1* | 5/2006 | Danieli ................... G10L 15/08 704/251 |
| 2007/0028264 A1* | 2/2007 | Lowe ................ G06F 17/30017 725/35 |
| 2007/0214476 A1 | 9/2007 | Zalewski et al. |
| 2008/0184284 A1* | 7/2008 | O'Hern ................. H04H 60/48 725/28 |
| 2009/0049467 A1 | 2/2009 | Robson |
| 2009/0193420 A1 | 7/2009 | Ayars |
| 2010/0225808 A1 | 9/2010 | Mears |
| 2011/0034242 A1 | 2/2011 | Aronzon |

* cited by examiner

IPTV Audio Replacement Application Settings – Words to Replace

600
FIG. 6

IPTV Audio Replacement Application Settings – Monitored Channels Configuration

700
FIG. 7

IPTV Audio Replacement Application Settings – Closed Captioning

800
FIG. 8

Viewer checks off the desired setting(s) and presses the yellow smart key to choose to save the settings to use for their NoSwear application.

APPARATUS AND METHOD FOR MEDIA DETECTION AND REPLACEMENT

CROSS-REFERENCE TO RELATED APPLICATIONS

This application is a Continuation of and claims priority to U.S. patent application Ser. No. 12/570,601 filed Sep. 30, 2009. The contents of each of the foregoing is/are hereby incorporated by reference into this application as if set forth herein in full.

FIELD OF THE DISCLOSURE

The present disclosure relates generally to media detection and replacement and more specifically to an apparatus and method for media detection and replacement.

BACKGROUND OF THE DISCLOSURE

The Internet and other networks provide users with a means for experiencing and sharing various types of media content. The media content can often include audio content, video content, text content, still image content, and/or combinations thereof. Other media content providing sources can include Internet Protocol Television (IPTV), cable TV, and satellite TV. During presentation of a particular media program, users can be presented with audio, video, and/or closed captioned content during presentation of the media program. Different and/or substitute versions of the various types of content can also be provided to the user as well.

BRIEF DESCRIPTION OF THE DRAWINGS

FIG. 7 depicts a user interface for selecting which source to use to provide the input regarding which channels and/or events to monitor and replace media content on;

DETAILED DESCRIPTION OF THE DRAWINGS

One embodiment of the present disclosure can entail a server having a controller configured to receive a selection from a computing device during presentation of a media program comprising at least one of audio content and textual content associated with the audio content, wherein the selection identifies media content of interest, receive a selection from the computing device identifying replacement content for the media program, detect whether the media program contains the identified media content of interest, and replace the identified media content of interest with the replacement content if the identified media content of interest is detected in the media program.

Another embodiment of the present disclosure can entail a method including identifying media content of interest and replacement content for the media content of interest via at least one of a graphical user interface (GUI) and a batch file feed, wherein the media content of interest is associated with a media program, and transmitting the identifications to a server operating in an interactive television (iTV) network, wherein the media content of interest is determined by the server to be in the media program, wherein the replacement content is retrieved by the server, and wherein the media content of interest is replaced with the retrieved replacement content by the server during the media program.

Yet another embodiment of the present disclosure can entail a computer-readable storage medium having computer instructions to receive a selection from a computing device operating in an iTV network, wherein the selection identifies media content of interest associated with a media program, receive a selection from the computing device identifying replacement content to replace the media content of interest, determine whether the media program contains the identified media content of interest, retrieve the replacement content if the media program is determined to contained the identified media content of interest, and replace the identified media content of interest with the replacement content during presentation of the media program.

Figure 1:
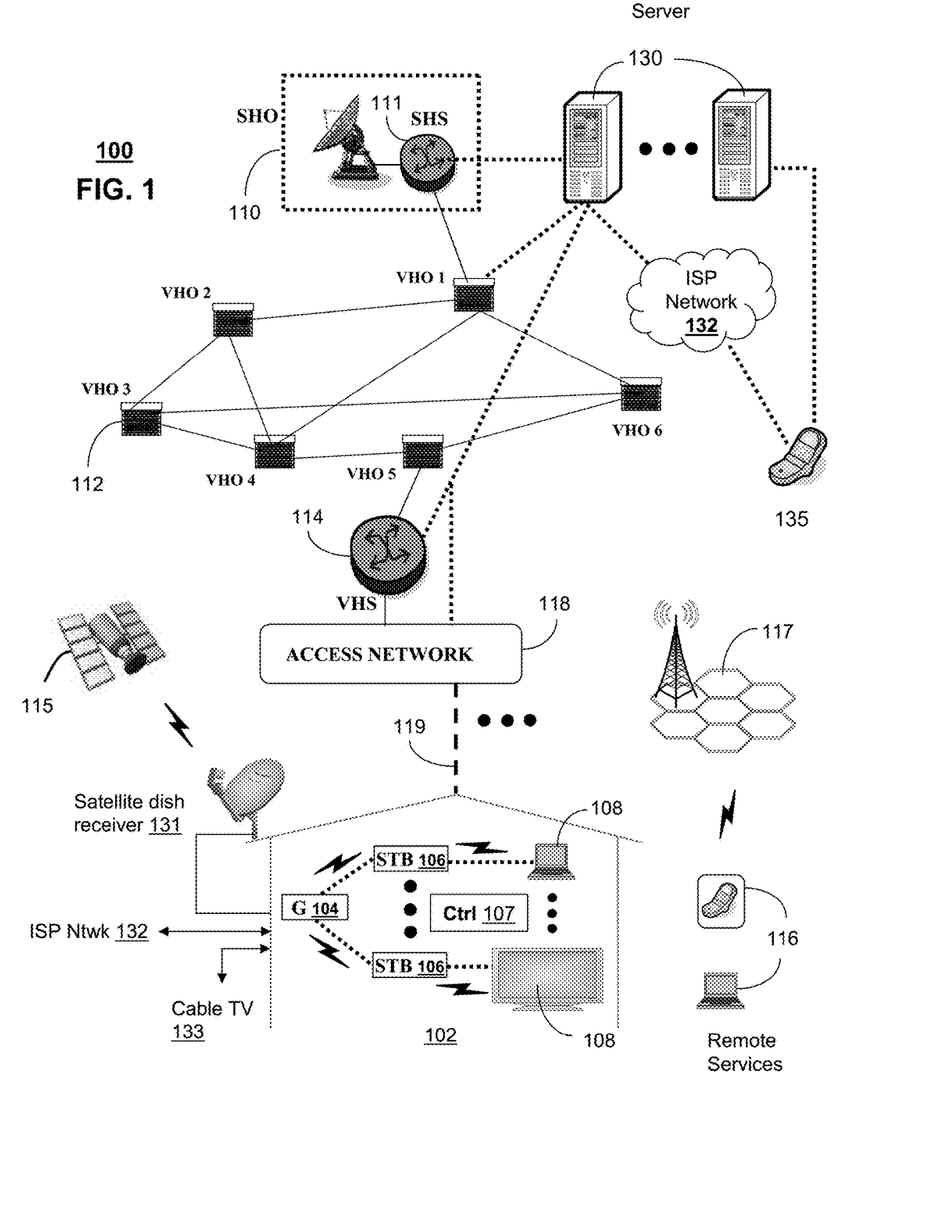
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a mobile device 135. The mobile device 135 can be a cellular phone, personal digital assistant, smart phone, personal computer, or other similar device. The mobile device 135 can be configured to be operably coupled to ISP network 132. Additionally, the mobile device 135 can be operably coupled to the STBs 106 and other devices in the system 100. Notably, mobile device 135 can contain a software application or have access to a software application, which can enable the mobile device 135 to detect and replace audio, textual, or other content associated with a media program playing on the mobile device 135 or on other devices in the system 100.

A user of the mobile device 135 can select, via the application, content that the user deems to be interesting. Additionally, the user can select substitute or alternate content to replace the selected interesting content. Either a batch interface or a GUI can be utilized to input the selections. The selected interesting content and information about the selected interesting content can also be stored by the mobile device 135 and/or by the application for future use.

Another distinct portion of the computing devices 130 can function as a server (herein referred to as server 130). The server 130 can use common computing and communication technology to perform the function of distributing media content and/or other types of content to various devices in the system 100. Notably, the server 130 can be configured to communicatively link to the mobile device 135, gateway 104, the STBs 106, and other devices in the system 100. The server 130 can be configure to contain the software application for detecting content that is selected as "interesting" by the mobile device 135, the STBs 106, and/or other devices in the system 100 such as media device 108. The selected content can then be replaced with substitute content by the server 130.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
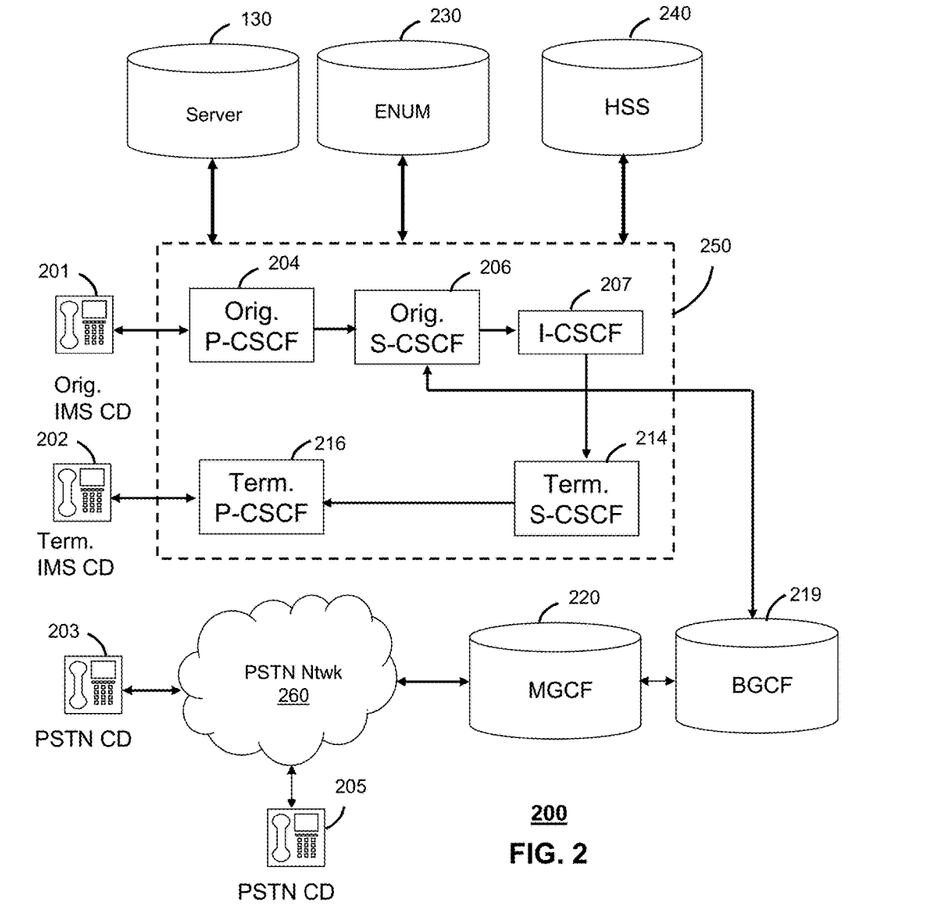

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
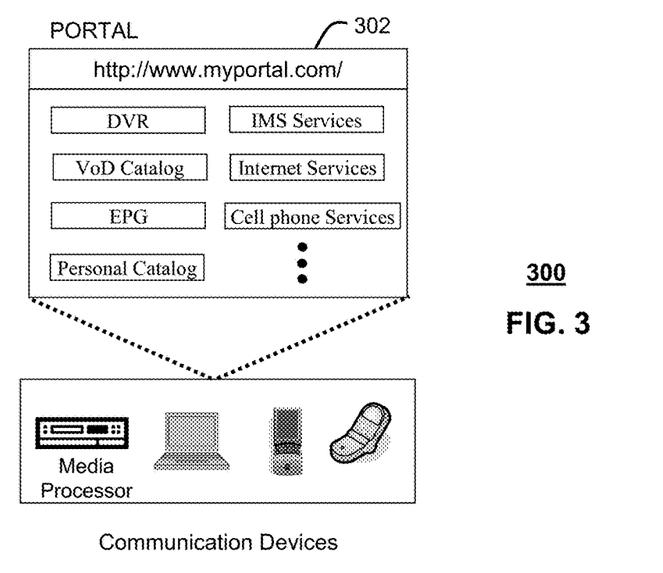
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1.

The portal 302 can be used for managing services of communication systems 100-200. The portal 302 can be accessed by a Uniform Resource Locator (URL) with a common Internet browser such as Microsoft's Internet Explorer® using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
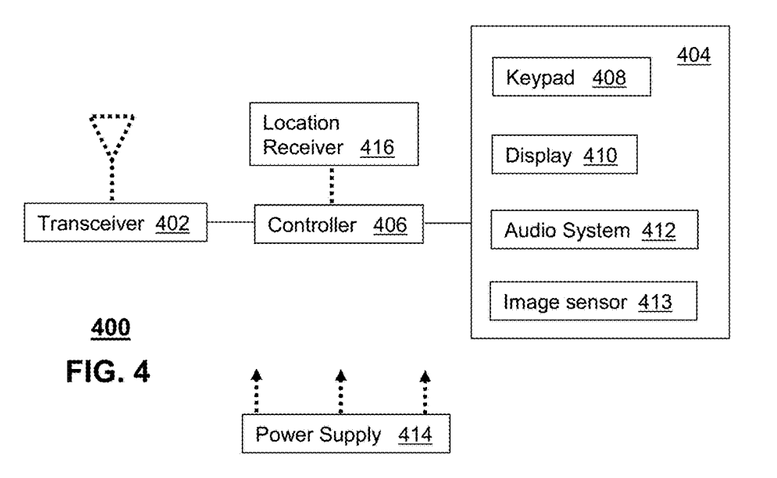
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
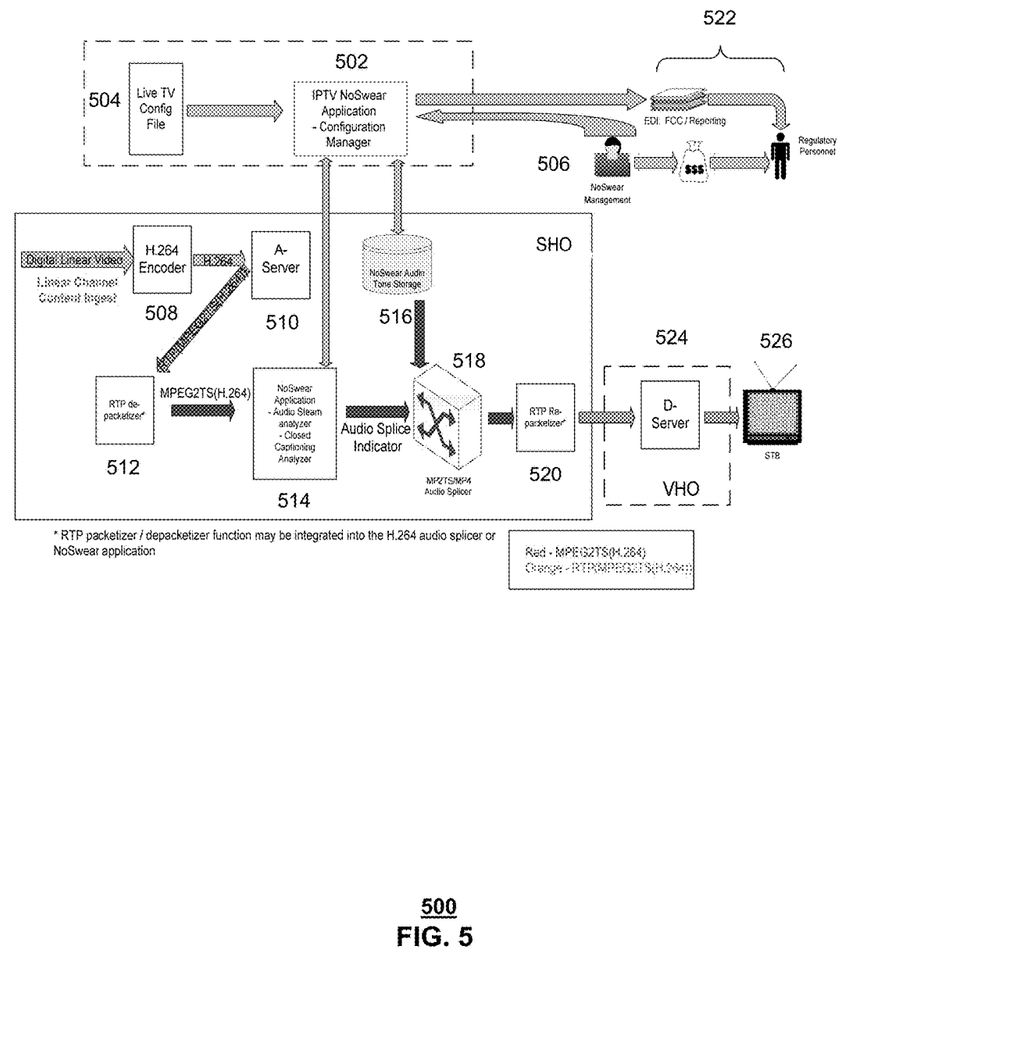
FIG. 5 depicts an illustrative embodiment of a system for media detection and replacement, which can operate in portions of the communications systems of FIGS. 1-2.

FIG. 5 depicts an illustrative embodiment of a system 500 for media detection and replacement, the system operable in portions of the communication systems of FIGS. 1-2. The devices in the system 500 can be configured to operate in an iTV network, which can include IPTV, cable television, and satellite television. Additionally, the devices in the system 500 can be configured to transmit, receive, and process any internet-based content or other content. The system 500 can include a centralized application 502 that can deploy a configuration manager, which can include a batch interface (live television configuration file) 504 and a GUI for management logon 506. The application 502 can be configured to execute on a server or other computing device. The server can be a device capable of processing data, which can communicate with the devices in the system 500. Notably either the batch interface 504 or the GUI 506 or a combination thereof can be utilized to input selections regarding media content of interest. For example, the batch interface 504 and/or the GUI 506 can be utilized to input channels and/or events that the application 502 should monitor on behalf of a user.

Additionally, users can access the application 502 via a mobile device, such as mobile device 135, a personal computer, STBs 106, video game system, and/or other computing/media devices. The aforementioned devices can access the application 502 by utilizing a communications protocol such as TCP/IP. Once a device accesses the application 502, the application 502 can present a user with a user interface, such as GUI 506, by utilizing a programming language such as HTML. The users and/or service provider management can select media content of interest via the GUI 506 for the application 502 to monitor. The media content can include audio content, video content, still image content, text content, text content associated with the audio content (such as closed captioning content), and other content. Also, replacement content can be selected to replace the media content of interest, whether it be audio, text, or other content. The replacement content and other content can be stored in a database 512.

Figure 6:
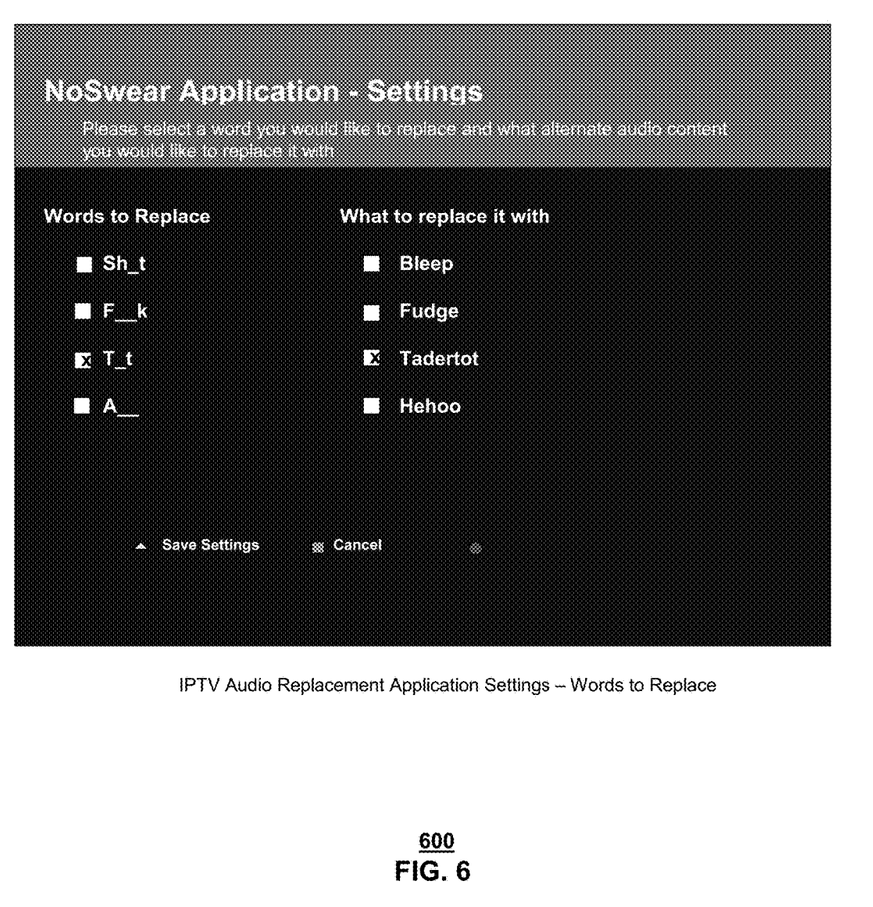
FIG. 6 depicts a user interface of a configuration manager that features audio replacement application settings, wherein the configuration manager can operate in the systems of FIGS. 1-2 and 5.

Referring now also to FIG. 6, a user interface 600 of the application/configuration manager 502 that features audio replacement application settings is illustratively shown. The user interface 600 can enable a user to identify what media content of interest the application 502 needs to monitor. For example, the interface 600 can include a list of words to replace, such as offensive language. The user can select each word that the user is interested in monitoring. Similarly, the user can select a replacement word or words to replace the selected media content of interest. As FIG. 6 shows, the checked word can be replaced with the word "tadertot" each time the checked word is detected by the application 502 and/or applications associated with the application 502. The user interface 600 can be configured to allow the user to save the settings or cancel changes as well.

Figure 7:
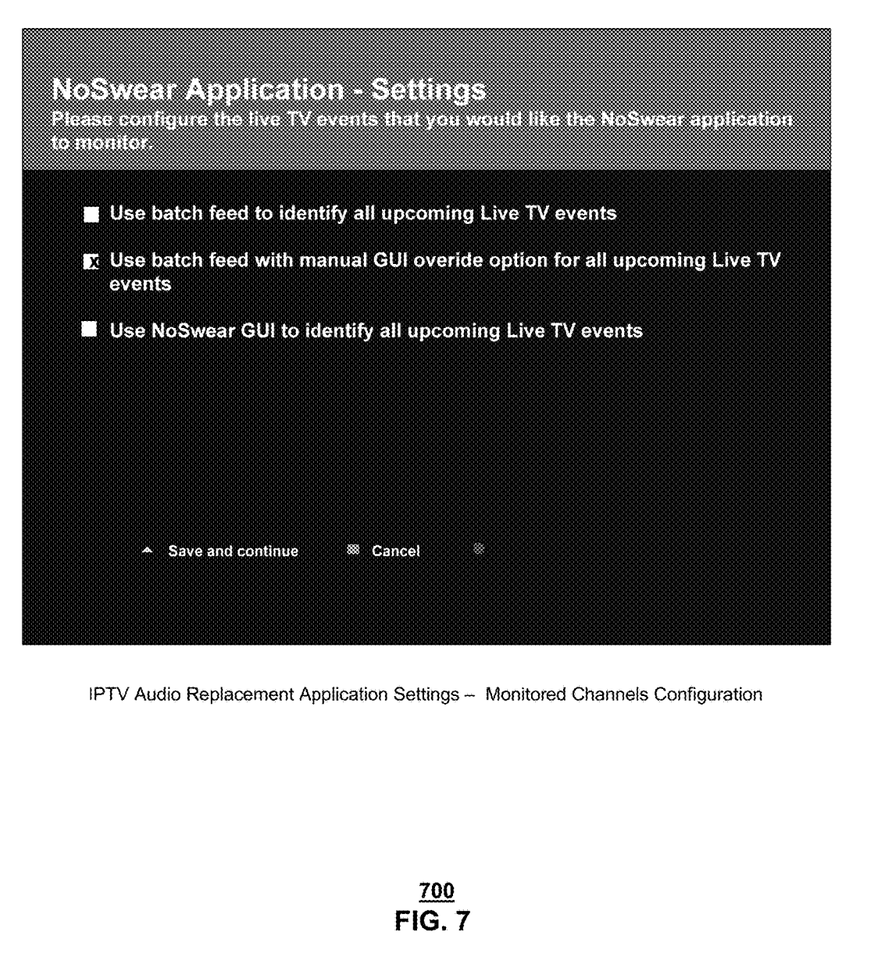

Referring now also to FIG. 7, a user interface 700 for selecting which source to use to provide the input regarding which channels, content, and/or events to monitor and replace media content on is illustratively shown. The user interface 700 can allow the user to select the option to use a batch feed to identify all upcoming media content, such as live television events. Additionally, the user interface 700 can enable the user to use a batch feed with a manual GUI override option for the upcoming media content. Furthermore, an option can be given to the user to simply use the GUI to identify all upcoming media content.

Figure 8:
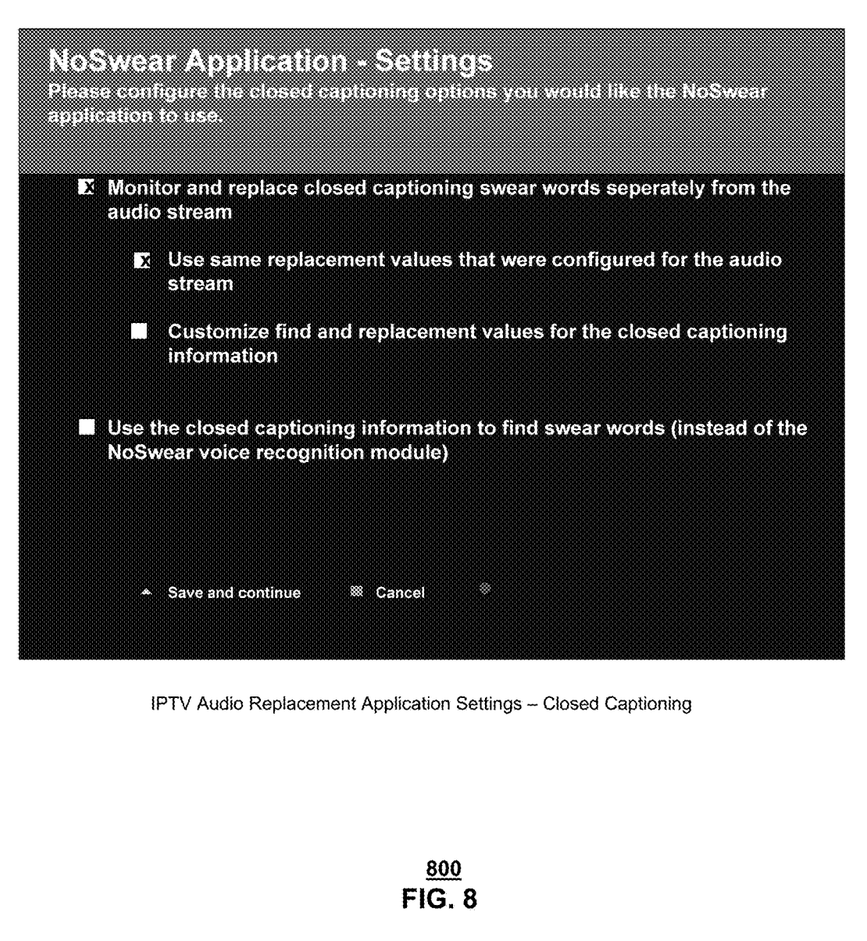
FIG. 8 depicts a user interface for selecting closed captioning options.

Referring now also to FIG. 8, a user interface 800 for selecting closed captioning options is depicted. The user interface 800 can enable a user to select an option to monitor and replace closed captioning content occurring during a media program separately from the audio content associated with it. Also, the user interface 800 can provide the user with the option to use the same replacement content values that the user designated for audio content. The user can also be allow to customize find and replacement values for the close captioning content as well. Furthermore, an option can be provided to allow the user to use the closed captioning information to find the media content of interest instead of using a voice recognition module, which is used for audio content and is further described below.

Figure 9:
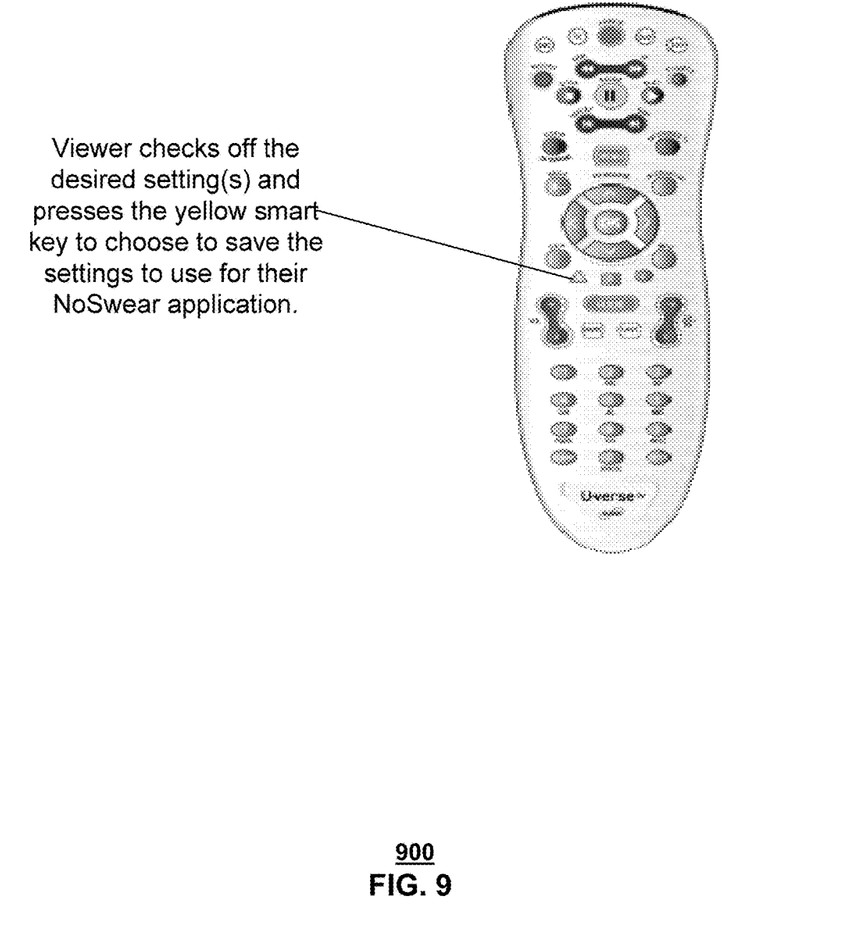
FIG. 9 depicts a remote control device which can be utilized in the systems of FIGS. 1-2 and 5.

Referring now also to FIG. 9, a remote control device 900 which can be utilized in the systems of FIGS. 1-2 and 5 is illustratively shown. The remote control device 900 can be utilized by a user to access the application 502 from the comfort of the user's home or other similar location. Specifically, the remote control device 900 can enable the user to select various options to identify media content of interest and replacement content for the media content of interest. The user can also save their settings and other changes performed in the application 502 using the remote control device 900.

Once the user or other individual has made his/her selections pertaining to the media content of interest and replacement content, the media content can enter a network associated with the devices of system 500, and can be received by an encoder, such as h.264 encoder 508. Once the media content is received by the encoder, the encoder can output the media content in h.264 format. The encoder can relay the media content to a server, such as IPTV A-server 510, which can add digital rights management (DRM) to the media content so as to protect the media content. Additionally, the IPTV A-server 510 can encapsulate the media content utilizing real-time transfer protocol (RTP) so as to allow the media content to be streamed in real-time.

In an embodiment, the IPTV A-server 510 or other server can proceed to transmit the media content to an RTP depacketizer 512, which can be configured remove the RTP header from the media content. In an embodiment, the DRM information can also be removed from the media content. The RTP depacketizer 512 can transmit the media content to an analyzer 514, which can utilize a processor and can be operably coupled and/or associated with the application 502.

The analyzer 514 can analyze the media content to find the selected media content of interest. Notably, the analyzer 514 can analyze audio content separately from text content or other content.

When analyzing audio content, the analyzer 514 can utilize a voice recognition module to detect the media content of interest in the streamed audio content. If the media content of interest is detected, an indicator with a pointer to the replacement content can be inserted into the audio stream at the start of the media content of interest. The actual replacement content, information about the media content of interest, and other information can be stored in database 516. At this point, an audio splicer 518 can be utilized to recognize the indicator with the pointer and access the replacement content from the database 516. Upon accessing the replacement content, the splicer 518 can splice/insert the replacement content into the audio stream in place of the detected media content of interest.

With regard to text content, the analyzer 514 can analyze the text content for the media content of interest. If the media content of interest is detected in the text stream, replacement text content can be used to replace the detected media content of interest. Once the audio content, text content, and/or other content is detected and/or replaced, the RTP repacketizer 520 can reinsert/replace the RTP header into the media content. Additionally, DRM information can also be inserted back into the media content. The application 502 can report information pertaining to the detection and replacement of the media content of interest to relevant external resources, such as the Federal Communications Commission (FCC), via an electronic interface 522, such as an Electronic Data Interchange (EDI) interface. Billing, report, and logging information can also be utilized in the system 500 to satisfy reporting obligations or for other purposes.

Once the media content has been detected and/or replaced, the content can be transmitted to a distribution server 524, which can then relay the media content to a media device 526 for display. The media device 526 can be a STB, personal computer, mobile device, or other device capable of displaying the media content. The operative functions of the system 500 are not intended to be limited to being provided by an IPTV-based solution, but, instead, can be extended to any interactive television-based solution, internet-based solution, or other similar solution.

Figure 10:
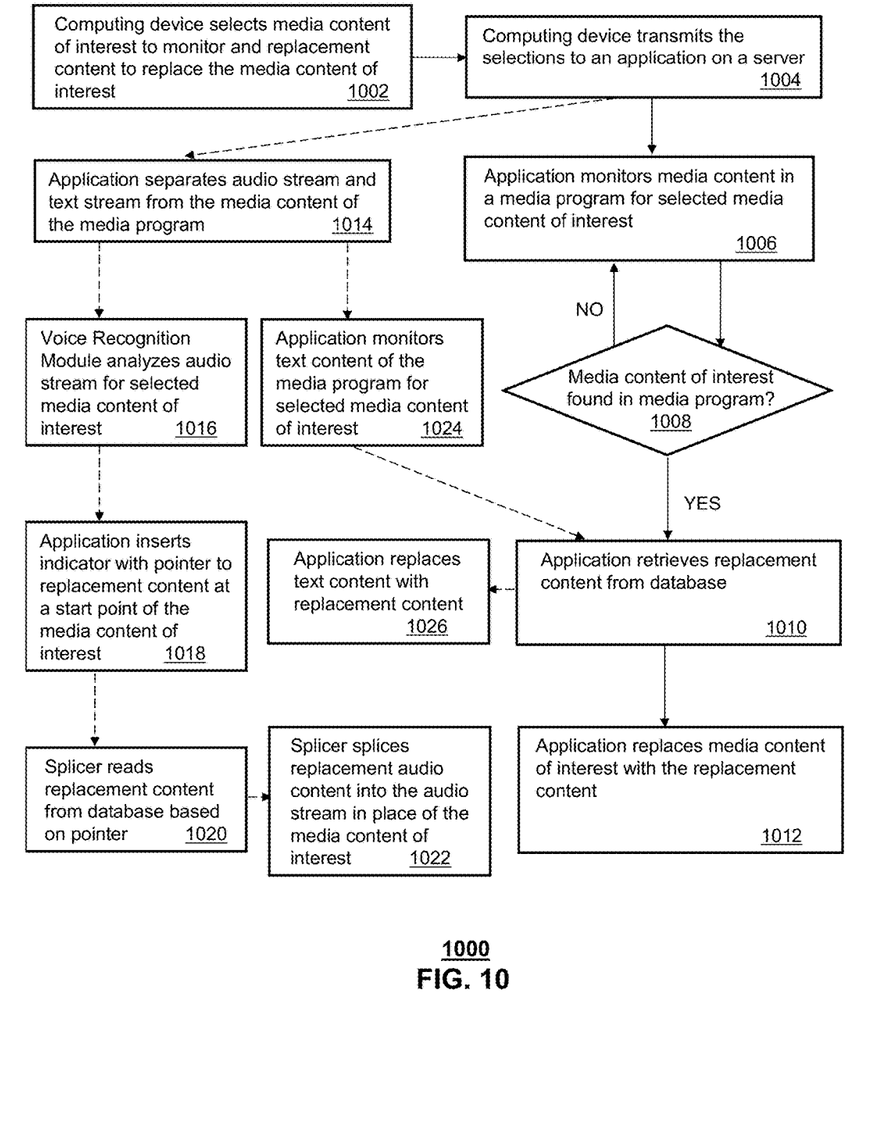
FIG. 10 depicts an illustrative embodiment of a method for media detection and replacement, the method operating in portions of the communication systems of FIGS. 1-2 and FIG. 5.

FIG. 10 depicts an illustrative method 1000 for detecting and replacement media content that operates in portions of the communication systems of FIG. 1-2 and FIG. 5. Method 1000 can begin with step 1002 in which a user can utilize a computing device to select media content of interest to be monitored and replacement content to replace the media content of interest. Notably, a batch interface or a GUI or a combination thereof can be utilized to input the selections regarding media content of interest and the replacement content. For example, the user can select an option in a GUI to monitor every occurrence of an offensive word for a selected media program. The user can also select a non-offensive replacement word such as "hello" to replace each occurrence of the offensive word in the media program. At step 1004, the computing device can transmit the selections to an application, such as application 502, which can reside on a server.

At step 1006, the application can monitor the selected media program for the selected media content of interest. The application can determine whether the media program contains the selected media content of interest at step 1008.

If the media program does not contain the selected media content, the application can simply let the media program continue, monitor another selected media program, stop monitoring the media program, or conduct other operations. On the other hand, if the application detects the selected media content of interest in the media program, the application can retrieve the replacement content from a database at step 1010. At step 1012, the application can replace the detected media content of interest with the replacement content. The replaced content can then be presented to the user instead of presenting the detected media content of interest.

In one embodiment, once the computing device transmits the selections to the application in step 1004, the application can be configured to separate an audio stream and a text stream (such as closed captioning content associated with the audio content) from a media program at step 1014. With regard to the separated audio stream, the application can enable a voice recognition module to analyze the audio stream for the selected media content of interest at step 1016. If the selected media content of interest is found in the audio stream, an indicator with a pointer to the replacement content can be inserted at the beginning of the media content of interest at step 1018. For example, if the media content of interest was the word "computer," the pointer can be inserted at the point in the stream where the word "computer" begins. At step 1020, an audio splicer operably coupled to the application can access the replacement content based on the pointer. At step 1022, the audio splicer can splice the replacement content into the audio stream in place of the media content of interest. The audio stream can then be presented to the user with the replacement content.

With regard to the text stream, the application can monitor the text stream of the media program for the selected media content of interest at step 1024. If the application detects the media content of interest in the text stream, the application can retrieved the replacement content from the database, as the application performed in step 1010. Once the replacement content is retrieved, the application can replace the detected media content of interest with the retrieved replacement content at step 1026.

Upon reviewing the aforementioned embodiments, it would be evident to an artisan with ordinary skill in the art that said embodiments can be modified, reduced, or enhanced without departing from the scope and spirit of the claims described below. For example, in an embodiment, the database 516 can be configured to store the media content of interest, information associated with the media content of interest, the replacement content, information associated with the replacement content, and other information. In one embodiment, the database 516 can store an identification information associated with the media program, a time associated with detection of the identified media content of interest, a time associated with replacement of the identified media content of interest, and an identifier indicating successful replacement of the identified media content interest.

In another embodiment, the operative functions of detecting, analyzing, and replacing content can be performed entirely by the application 502. In one embodiment, the application 502 can be configured to automatically monitor media programs based on a schedule. For example, the user can specify that the application should monitor a particular program that plays at 8 p.m. every night of the week. In another embodiment, the functionality of the system 500 and the application 502 can be present in any of the other devices of the system 500 or any other device. For example, the functionality can reside at the media device 526, at a personal computer of the user, a gaming system of the user, or at a mobile device of the user. Additionally, the application and other functional components of the system 500 can perform the method steps in a way such that the user's devices/subscriber equipment are not directly involved in detection and replacement of the media content of interest. As an example, the detection, analysis, replacement, and other functions of the present disclosure, can be performed entirely at a service provider of the user.

Other suitable modifications can be applied to the present disclosure without departing from the scope of the claims below. Accordingly, the reader is directed to the claims section for a fuller understanding of the breadth and scope of the present disclosure.

Figure 11:
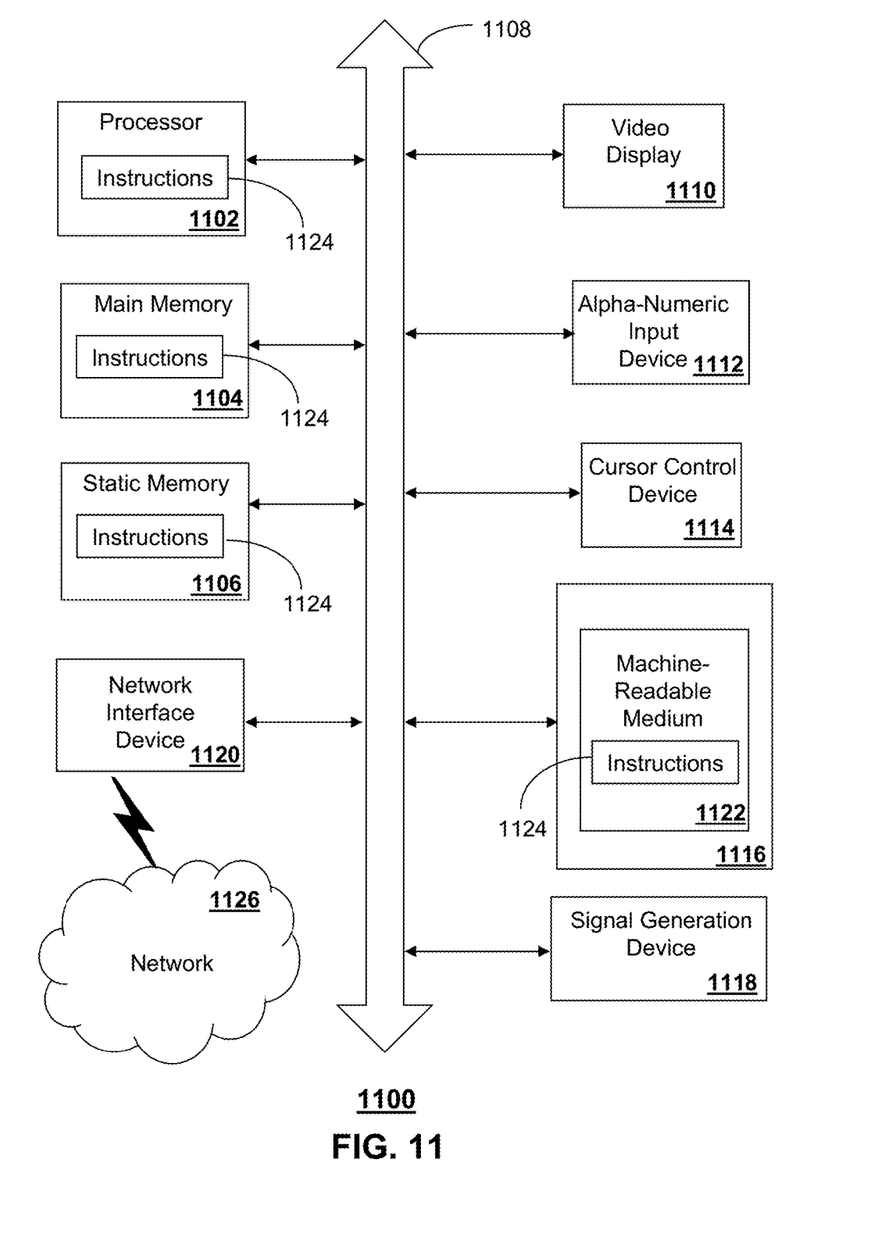
FIG. 11 is a diagrammatic representation of a machine in the form of a computer system within which a set of instructions, when executed, may cause the machine to perform any one or more of the methodologies discussed herein.

FIG. 11 depicts an exemplary diagrammatic representation of a machine in the form of a computer system 1100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1100 may include a processor 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, a solid state display, or a cathode ray tube (CRT)). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a machine-readable medium 1122 on which is stored one or more sets of instructions (e.g., software 1124) embodying any one or more of the methodologies or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1124, or that which receives and executes instructions 1124 from a propagated signal so that a device connected to a network environment 1126 can send or receive voice, video or data, and to communicate over the network 1126 using the instructions 1124. The instructions 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
  a processing system including a processor; and
  a memory that stores executable instructions that, when executed by the processing system, facilitate performance of operations, comprising:
    receiving a batch file feed, wherein the batch file feed comprises a plurality of media programs identified by equipment of a viewer;
    determining media content of interest based on a selection obtained from equipment of the viewer;
    detecting the media content of interest within an audio portion of a media program in the plurality of media programs; and
    inserting an indicator into the audio portion of the media program, wherein the indicator comprises a pointer to replacement content,
    wherein the indicator is inserted in the media program in response to the detecting of the media content of interest and points to the replacement content stored separately from the media program, wherein the replacement content is based on another selection obtained from the equipment of the viewer,
    wherein the inserting of the pointer comprises placing the pointer at a start point of the media content of interest within the media program to enable retrieval of the replacement content stored separately from the media program based on the pointer and replacement of the media content of interest of the media program with the replacement content, wherein the replacement of the media content of interest with the replacement content begins at the start point to obtain modified media content, and wherein the replacement of the media content of interest occurs prior to packetization of the modified media content for transport to a media processor for presentation at the equipment of the viewer.

2. The server of claim 1, wherein the server operates in an interactive television network, wherein the interactive television network is selected from a group consisting of internet protocol television, interactive cable television and interactive satellite television, and wherein the replacement content is read from a database based on the pointer.

3. The server of claim 1, wherein the audio portion comprises one of an audio stream, a text stream or both, and wherein the media content of interest is selected from a group consisting of audio content, textual content associated with the audio content, still image content, video content and combinations thereof.

4. The server of claim 1, wherein the operations further comprise storing information associated with the media content of interest, wherein the audio portion comprises an audio stream, and wherein the inserting of the pointer further comprises placing the pointer within the audio stream.

5. The server of claim 4, wherein the information associated with the media content of interest comprises a first identifier associated with the media program, a first time associated with detection of the media content of interest, a second time associated with replacement of the media content of interest, and a second identifier indicating successful replacement of the media content of interest.

6. The server of claim 1, wherein the plurality of media programs is determined based on a second selection obtained from equipment of a viewer comprising selected media programs, all live media programs, or a combination thereof, wherein the plurality of media programs includes the media program.

7. The server of claim 1, wherein the operations further comprise obtaining a textual representation of the audio portion, wherein the detecting of the media content of interest is based on the textual representation, and wherein the processing system comprises a plurality of processors operating in a distributed processing environment.

8. The server of claim 1, wherein the operations further comprise:
  detecting the media content of interest within a closed captioning portion of the media program; and
  replacing the media content of interest within the closed captioning portion of the media program with the replacement content, wherein the replacement of the media content of interest with the replacement content occurs during a presentation of the media program.

9. A method, comprising:
  receiving, by a processing system including a processor, a batch file feed, wherein the batch file feed comprises a plurality of media programs identified by viewer equipment;
  identifying, by a processing system including a processor, audio content of interest based on a selection obtained from the viewer equipment;
  identifying, by the processing system, alternate audio content for replacing the audio content of interest within an audio stream of a media program in the plurality of media programs, wherein the alternate audio content is based on another selection obtained from the viewer equipment, and wherein the alternate audio content is stored separately from the media program;
  detecting, by the processing system, an occurrence of the audio content of interest within a textual representation of the audio stream of the media program; and
  responsive to the detecting of the occurrence of the audio content of interest, inserting, by the processing system an indicator within the media program comprising a pointer to the alternate audio content, wherein the pointer is inserted at a start point of the occurrence of the audio content of interest within the audio stream of the media program,
  wherein the alternate audio content is retrieved based on the pointer,
  wherein the occurrence of the audio content of interest is substituted with alternate audio content beginning at the start point to obtain a modified audio stream, and
  wherein the replacement of the audio content of interest occurs prior to packetization of the modified audio stream for transport to a media processor for presentation at the viewer equipment.

10. The method of claim 9, wherein the processing system comprises an interactive television network selected from a group consisting of internet protocol television, interactive cable television and interactive satellite television, the method further comprising monitoring, by the processing system, a plurality of media programs comprising the media program based on a schedule.

11. The method of claim 9, wherein the audio stream comprises a text stream, and wherein the audio content of interest and the alternate audio content is selected from a group consisting of audio content, video content, still image content, text content, text content associated with the audio content and combinations thereof.

12. The method of claim 9, wherein further comprising:
  de-packetizing, by the processing system, the media program to obtain a de-packetized media program, wherein the detecting of the occurrence of the audio content of interest occurs within the de-packetized media program; and
  re-packetizing, by the processing system, the media program comprising the indicator.

13. The method of claim 9, wherein the audio stream correlates to the audio content of interest.

14. The method of claim 9, further comprising identifying, by the processing system, the alternate audio content by utilizing a device selected from a group consisting of personal computer, a mobile device and a set-top-box.

15. A machine-readable storage device, comprising executable instructions, which when executed by a processing system including a processor, facilitate performance of operations comprising:
  receiving, by way of viewer equipment, a first selection that identifies audio content of interest associated with a media program comprising an audio portion;
  receiving, by way of the viewer equipment, a second selection identifying replacement audio content;
  receiving, by way of the viewer equipment, a third selection identifying a plurality of media programs including the media program;
  determining that the audio portion of the media program contains the audio content of interest; and
  responsive to the determining that the audio portion contains the audio content of interest, inserting an indicator within an audio stream of the media program to obtain a modified media program, wherein the indicator comprises a pointer to the replacement audio content,
wherein the indicator is placed at a start point of the audio content of interest,
wherein a generating of the modified media program comprises:
  detecting the pointer within the audio stream;
  retrieving the replacement audio content based on the pointer; and
  substituting, within the audio stream, the audio content of interest with the replacement audio content beginning at the start point, prior to packetization of the audio stream for transport to equipment of a viewer for presentation.

16. The machine-readable storage device of claim 15, wherein the determining that the media program contains the audio content of interest is based on a textual representation of the audio portion, and wherein the processing system comprises a plurality of processors operating in a distributed processing environment.

17. The machine-readable storage device of claim 15, wherein the audio portion comprises one of an audio stream, a text stream or both, and wherein the operations further comprise retrieving the replacement audio content based on the pointer, and wherein the substituting of the audio content of interest with the replacement audio content begins at the start point.

18. The machine-readable storage device of claim 15, wherein the operations further comprise:
  re-packetizing the de-packetized media program comprising the replacement audio content; and
  storing information associated with the audio content of interest.

19. The machine-readable storage device of claim 15, wherein the operations further comprise replacing the audio content of the media program, wherein the audio content correlates to the audio content of interest.

20. The machine-readable storage device of claim 15, wherein the operations further comprise storing an identifier indicating that the substituting of the audio content of interest with the replacement audio content was successful.

* * * * *